United States Patent [19]
Watanabe et al.

[11] 3,988,024
[45] Oct. 26, 1976

[54] TURNTABLE APPARATUS

[75] Inventors: Terumoto Watanabe, Kanagawa; Masato Nagata; Shigeo Fukui, both of Yokohama; Manabu Okamura, Tokyo, all of Japan

[73] Assignee: Tokyo Shibaura Electric Co., Ltd., Kawasaki, Japan

[22] Filed: Feb. 26, 1975

[21] Appl. No.: 553,276

[30] Foreign Application Priority Data

June 14, 1974 Japan.................................. 49-67029

[52] U.S. Cl. .............................. 274/1 E; 274/39 A; 310/237; 310/268
[51] Int. Cl.$^2$ ...................... H02K 1/22; G11B 3/60; H01R 39/06
[58] Field of Search........... 274/39 A, 1 E; 310/237, 310/268

[56] References Cited
UNITED STATES PATENTS

| 1,480,553 | 1/1924 | Hoff..................................... 274/1 E |
| 2,847,589 | 8/1958 | Haydon............................... 310/237 |
| 3,090,880 | 5/1963 | Raymond............................ 310/237 |
| 3,407,320 | 10/1968 | McLean............................... 310/268 |
| 3,683,248 | 8/1972 | Kobayashi et al. ................ 274/39 A |
| 3,737,697 | 6/1973 | Kitamori............................. 310/268 |
| 3,803,433 | 4/1974 | Ingenito.............................. 310/268 |

*Primary Examiner*—Richard E. Aegerter
*Assistant Examiner*—Steven L. Stephan
*Attorney, Agent, or Firm*—Finnegan, Henderson, Farabow & Garrett

[57] ABSTRACT

Disclosed is a turntable apparatus which comprises a plurality of magnets provided on the inner surface of the turntable so as to be disposed in a state alternately opposite in polarity and a plurality of coils provided on a stationary substrate disposed to face said turntable, in a manner that the disposition of said plurality of coils is in corresponding relation to the disposition of said plurality of magnets, whereby said turntable is rotated by the electromagnetic force between said coils and magnets.

There is provided on said stationary substrate position detecting means for detecting the electromagnetic position of the magnets relative to the coils. The output signals from said position detecting means vary in level with a magnetic field variation due to the rotation of the turntable. There is provided means for controlling supply of a DC current to each coil upon receipt of an output signal from said position detecting means thereby to cause a rotating magnetic field to be produced in the coils. Further, there is provided means for operatively comparing a specific reference voltage with that inductive voltage induced in the coil which is proportional to the rotation speed of the turntable, thereby to control supply of a current to the coil from a power source, thus to control the flow of current supplied from said power source to the coil, i.e., the rotation speed of the turntable.

12 Claims, 14 Drawing Figures

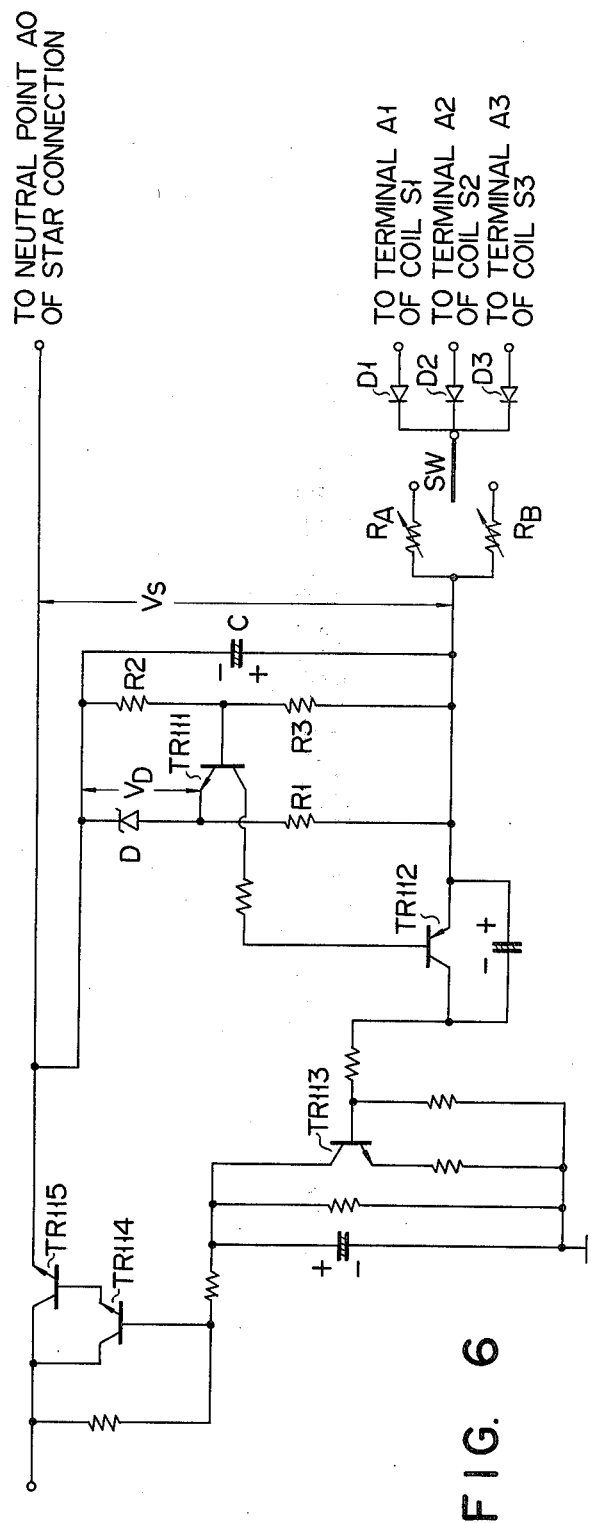
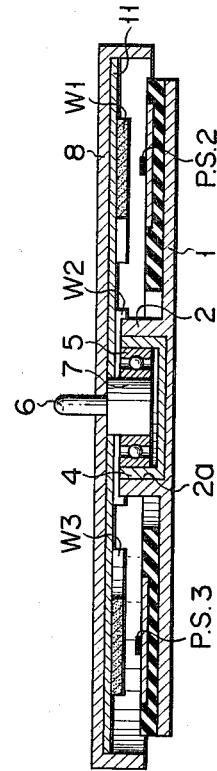
FIG. 6
FIG. 9

TURNTABLE APPARATUS

BACKGROUND OF THE INVENTION

This invention relates to a turntable apparatus for use in a record player, tape recorder, or the like.

Conventionally, as the turntable apparatus for use in a record player, tape recorder, or the like there is, for example, an AC motor device wherein the turntable is rotated by the AC motor. That is, the AC motor device is so designed that the high speed rotation of the AC motor is transmitted to the turntable through a belt, idle pulley or the like thereby to drive or rotate the turntable. The AC motor device, however, has the drawback that the vibration when the AC motor makes a high speed rotation, or the transmission unevenness when such high speed rotation is transmitted by a belt or idle pulley to the turntable, fails to permit the turntable to be stably and smoothly rotated. Further, the conventional turntable apparatus also includes a device wherein the shaft of a turntable is connected directly to the rotation shaft of a motor thereby to directly rotate the turntable without using a belt, idle pulley, or the like. This device has the drawback of rendering it difficult to form, as generally demanded, a record player, tape recorder, or the like into a flat configuration and simultaneously into a light apparatus. The conventional turntable apparatus further includes a "turntable apparatus" disclosed in Japanese Patent Application Publication No. 47802/72.

SUMMARY OF THE INVENTION

An object of the invention is to provide a turntable apparatus wherein the turntable can be stably and smoothly rotated at a predetermined speed.

Another object of the invention is to provide a turntable apparatus which can be formed into a flat configuration and simultaneously formed into a light one.

For the purpose of achieving the above objects, this invention provides a turntable apparatus wherein a turntable is rotatably shaft-supported on a stationary substrate; a plurality of magnets having substantially the same configuration are disposed on the inner surface of the turntable at substantially equal distances from the rotation center of the turntable and at substantially equal distances from one another, said plurality of magnets being alternately opposite in polarity; a plurality of coils are disposed on the stationary substrate in a manner that the disposition of said plurality of coils is in corresponding relation to the disposition of said pluralilty of magnets, whereby the turntable is rotated by the electromagnetic force produced between said coils and said magnets.

Other objects and features or advantages of the invention will become apparent from the following detailed description taken in conjunction with the accompanying drawings.

BRIEF DESCRIPTION OF THE DRAWING

FIG. 6 is a detailed circuit diagram illustrating an example of the transistor speed controller (TSC) shown by a block of FIG. 4;

FIG. 9 is a longitudinal sectional view of an improved example of the apparatus illustrated in FIG. 1;

DETAILED DESCRIPTION OF THE PREFERRED EMBODIMENTS

Figure 1:
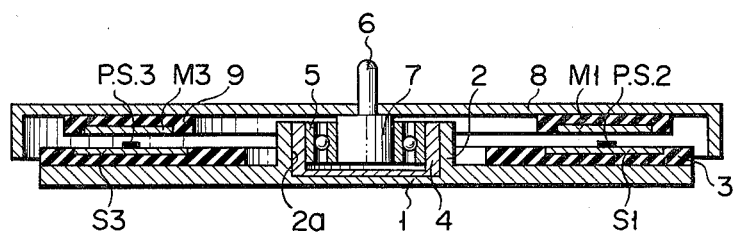
FIG. 1 is a longitudinal sectional view of a turntable apparatus according to an embodiment of the invention.
Figure 2:
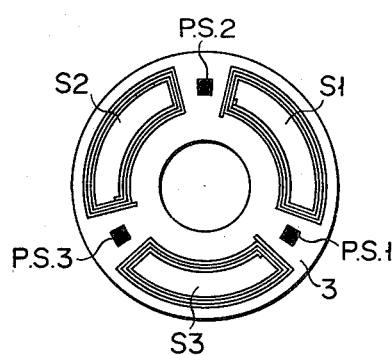
FIG. 2 is a small-sized plan view of an insulation plate on the stationary substrate of the apparatus of FIG. 1.
Figure 3:
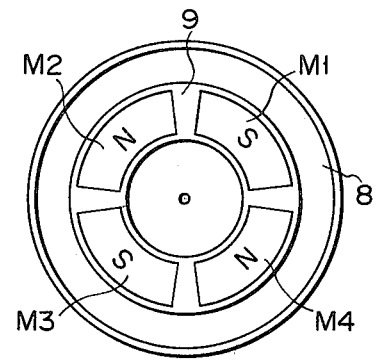
FIG. 3 is a small-sized plan view of the inner surface construction of the turntable of the apparatus illustrated in FIG. 1.

Referring to FIG. 1, onto the upper surface of a stationary substrate 1 formed with a hub 2 and recess 2a is bonded at a position spaced from the hub 2 a doughnut-shaped insulation plate 3, on the upper surface of which, as illustrated in FIG. 2, three coils S1, S2 and S3 having substantially the same configuration are printed at substantially equal distances from the center of the hub in a manner substantially equidistantly spaced from one another. Further, as illustrated in FIG. 2, three position detectors P.S.1, P.S.2 and P.S.3 such as a Hall element or position detecting coil are respectively disposed at the interspaces between the three coils S1, S2 and S3. Into the recess 2a formed on the stationary substrate 1 is fitted a cylindrical bottomed bearing box 4, into which is fitted a bearing 5. In the bearing 5 is received a turntable shaft 7 having a spindle section 6. A turntable 8 disposed facing the coils S1, S2 and S3 is rotatably supported by said turntable shaft 7. As illustrated in FIG. 3, onto the inner surface of the turntable 8 is bonded an annular thin synthetic resin material, on the inner surface of which four magnets M1, M2, M3 and M4 are printed in a manner alternately opposite in polarity. The disposition of these four magnets M1, M2, M3 and M4 is in corresponding relation to the disposition of the three coils S1, S2 and S3 printed on the upper surface of said insulation plate 3.

Figure 4:
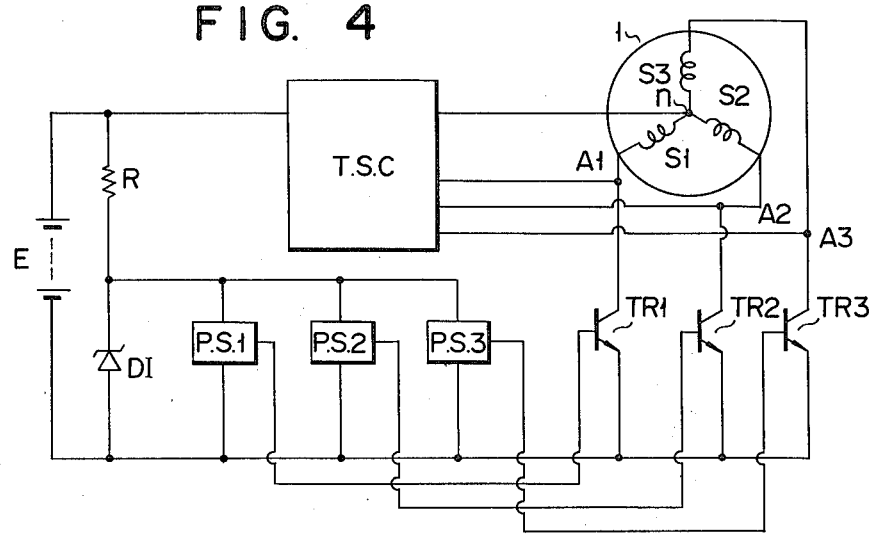
FIG. 4 is a block circuit diagram illustrating a circuit for driving and controlling the turntable illustrated in FIG. 1.

In a circuit, illustrated in FIG. 4, for driving and controlling the above-mentioned turntable, the anode of a DC power source E is connected to a neutral point n located at the center of a star-connected configuration of coils S1, S2 and S3 through a transistor speed controller (TSC) for controlling the rotation speed of the turntable. The terminals A1, A2 and A3 of the coils S1, S2 and S3 are connected to the collectors of the transistors TR1, TR2 and TR3 respectively. The emitters of the transistors TR1, TR2 and TR3 are respectively connected to the cathode of the DC power source E. To the ends of the DC power source E is connected a series circuit of resistor R and regulating diode DI. The position detectors P.S.1, P.S.2 and P.S.3 parallel-connected to each other are connected to both ends of the regulating diode DI. Accordingly, a DC constant voltage across the diode Dl is applied to these detectors P.S.1, P.S.2 and P.S.3. The output terminals of the position detectors P.S.1, P.S.2, and P.S.3 are connected to the bases of the transistors TR1, TR2 and TR3, whereby the output signals of the position detectors P.S.1, P.S.2 and P.S.3 varying in level with a magnetic field variation due to the rotation of the turntable 8 are supplied or cease to be supplied to the transistors TR1, TR2 and TR3, respectively, so that they are rendered conductive or nonconductive. As the result, the current supplied from the source E to the coils S1, S2 and S3 is controlled to produce a rotating magnetic field for rotating the turntable. The transistor speed controller (TSC) connected between the anode of the source E and the respective treminals A1, A2 and A3 of the star-connected coils S1, S2 and S3 compares a specific reference voltage with the inductive voltage induced in said coils which is proportional to the rotation speed of the turntable thereby to control the magnitude of a current supplied from the DC source E to the coils S1, S2 and S3, that is, the rotation speed of the turntable.

Figure 5:
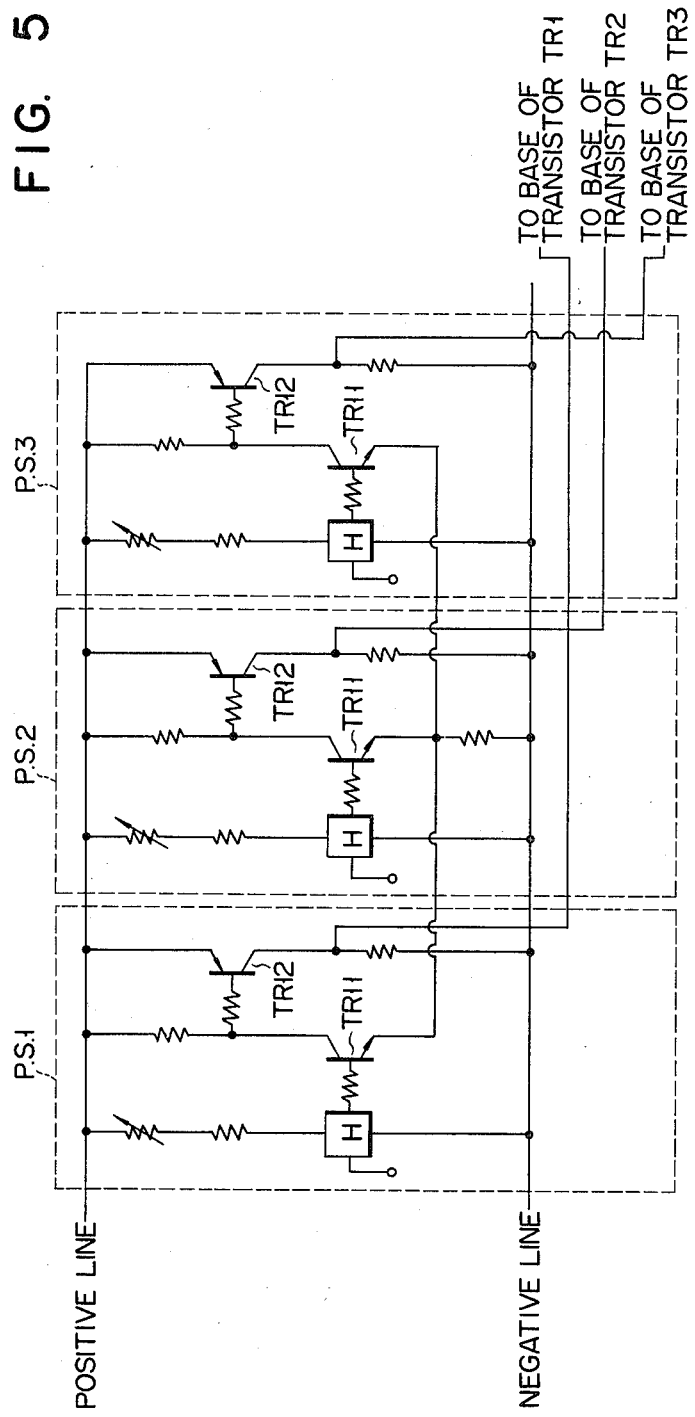
FIG. 5 is a detailed circuit diagram illustrating an example of the position detecting means shown by blocks of FIG. 4.

There will now be described the operation of the position detecting means illustrated in FIG. 5. In the illustration, the position detectors P.S.1, P.S.2 and P.S.3 constituting the position detecting means have the same construction. The position detecting means is so designed that at one point of time only a given one of the three position detectors P.S.1, P.S.2 and P.S.3 which faces an N pole magnet generates an output signal. When it is now assumed that the position detector P.S.1 faces one N pole magnet as a result of the rotation of the turntable, a transistor TR11 of the position detector P.S.1 is turned on and accordingly a transistor TR12 of the position detector P.S.1 is turned on to cause an output signal to be supplied from the position detector P.S.1 to the corresponding transistor TR1. When an output signal is supplied to the transistor TR1, this transistor is turned on to cause a current to flow in the corresponding coil S1. When the position detector P.S.1 faces one S pole magnet, the transistor TR11 of the position detector P.S.1 is turned off and accordingly the transistor TR12 is turned off to cause an output signal to cease to be supplied from the position detector P.S.1 to the transistor TR1. Accordingly, the transistor TR1 is turned off, so that no current flows in the coil S1.

When the position detector P.S.1 has faced said one S pole magnet, the position detector P.S.2 faces the other N pole magnet. As the result, the position detector P.S.2 and transistor TR2 are operated in the same manner as in the case of the position detector P.S.1 to cause a current to flow in the coil S2.

When the position detector P.S.2 has faced the other S pole magnet, a current ceases to flow in the coil S2 and simultaneously the position detector P.S.3 faces said one N pole magnet to cause a current to flow in the coil S3 in the same manner as in the case of the position detectors P.S.1 and P.S.2.

When the position detector P.S.3 has faced said one S pole magnet, a current ceases to flow in the coil S3 and simultaneously the position detector P.S.1 faces said other N pole magnet, namely, the position detector P.S.1 is brought to the original condition. By performing the foregoing operational cycle repeatedly, a rotating magnetic field is produced to permit the turntable to be rotated.

There will now be described the operation of the transistor speed controller (TSC) illustrated in FIG. 6.

A voltage VD across a regulating diode D is a specific reference voltage for specifying the rotation number of the turntable. Those back electromotive forces induced in the coils S1, S2 and S3, respectively, which are respectively proportional to the rotation speed of the turntable are rectified by diodes D1, D2 and D3, respectively, to become pulsating powers, the harmonic wave components of which are then removed by a filter consisting of a condenser C and a resistor RA or a filter consisting of the condenser C and a resistor RB to permit said pulsating powers to become DC powers. The respective DC powers are supplied to a bridge circuit comprised of said diode D and resistors R1, R2 and R3.

When it is now assumed that a switch SW is closed on the side of either the resistor RA or RB and that the unit rotation number of the turntable is reduced to a value lower than a specified unit rotation number of the turntable, namely, the voltage VS of a back electromotive force produced in the coil is lower than said specific reference voltage VD, the balanced condition of the bridge circuit comprised of the diode D and resistors R1, R2 and R3 is lost to render a transistor TR111 nonconductive, so that transistors TR112 and TR113 are rendered nonconductive. Accordingly, transistors TR114 and TR115 are rendered conductive to cause the power from the power source E to be supplied to the coils. When a source power is applied to the coils, the rotation speed of the turntable is increased to permit the turntable to be rotated with said specified unit rotation number.

Next, when the unit rotation number of the turntable exceeds said specified unit rotation number, namely, when the voltage VS of a back electromotive force induced in the coil is higher than said specific reference voltage VD, the balanced condition of said bridge circuit is lost to render the transitor TR111 conductive, so that the transistors TR112 and TR113 are rendered conductive. Accordingly, the transistors TR114 and TR115 are rendered nonconductive to stop the power supply from the source to the coils. When power ceases to be supplied from the source to the coils, the rotation speed of the turntable is decreased to permit the turntable to be rotated with said specified unit rotation number. Thus, the unit rotation number of the turntable is always kept constant.

The switch SW is provided for the purpose of constructing the TSC circuit so that either of the resistor RA and RB having different resistance values can be selected in accordance with a unit rotation number specified for each record of disc. Further, the resistors RA and RB are respecitvely so designed that the resistance values thereof can be subjected to a minute adjustment.

Figure 7:
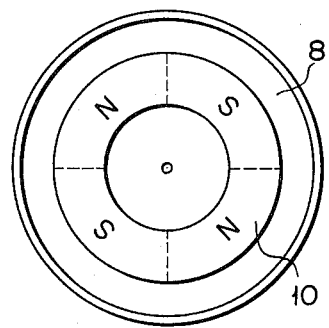
FIGS. 7 and 8 respectively illustrate modified examples of the inner surface construction of the turntable illustrated in FIG. 1.
Figure 8:
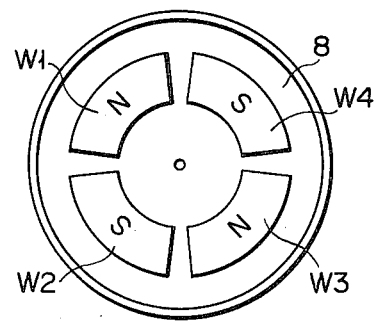

The preceding embodiment referred to the case where the four magnets M1, M2, M3 and M4 having substantially the same configuration are disposed printed on the inner surface of the annular thin synthetic resin material bonded onto the inner surface of the turntable 8, in a manner that said four magnets are located at substantially equal distances from the rotation center of the turntable and are substantially equidistantly spaced from one another and are alternately opposite in polarity. But this invention is applicable also to the case where, as illustrated in FIG. 7, an annular thin synthetic resin molding 10 prepared by kneading a synthetic resin with a powdered magnetizable material and molding the resultant kneaded mass is bonded onto the inner surface of the turntable 8 in a state wherein the center of said molding 10 is allowed to coincide with the center of the turntable, and is divided into equal parts, and is so magnetized as to permit said equal parts to be alternately opposite in polarity. Further, this invention is applicable also to the case where, as illustrated in FIG. 8, four lump like flat magnets W1, W2, W3 and W4 having substantially the same configuration are bonded onto the inner surface of the turntable 8 in a state disposed at substantially equal distances from the rotation center of the turntable and at substantially equal distances from one another, said flat magnets being alternately opposite in polarity.

FIG. 9 illustrates an example partially improved in the turntable apparatus illustrated in FIG. 1. Where the above-mentioned turntable apparatus is used in a sounder device such as a record player or tape recorder, magnetic fluxes produced from the magnets disposed on the inner surface of the turntable are leaked over the turntable to produce sound noises, and particularly where the magnetic field of each magnet is strong, the leaked magnetic flux is increased to render such sound noises higher. For the purpose of removing this drawback, the apparatus illustrated in FIG. 9 is so constructed that a yoke plate 11 is provided between the inner surface of the turntable 8 and the arrangement of magnets W1, W2, W3 and W4 so as to permit the most part of magnetic fluxes produced from the magnets W1, W2, W3 and W4 to pass within the yoke plate 11, thereby to suppress leakage of the magnetic flux over the turntable.

Figure 10:
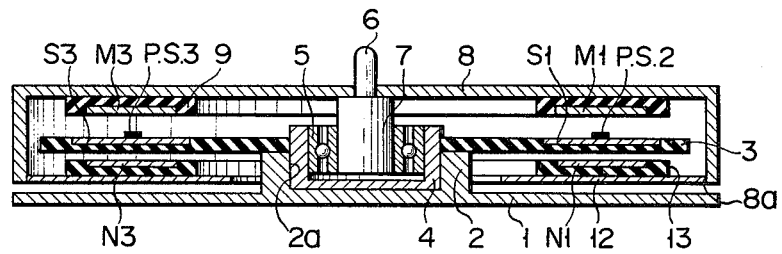
FIG. 10 is a longitudinal sectional view of a turntable apparatus according to another embodiment of the invention.

FIG. 10 illustrates another modification of the turntable apparatus according to the invention. This modification is the one wherein the turntable is designed to have an increased driving torque. That is, a doughnut-shaped insulation plate 3 wherein coils S1, S2 and S3 are disposed printed is fixedly supported on an upper portion of hub 2 of a stationary substrate 1 so as to face the stationary substrate 1 at a position spaced from the substrate 1. Further, an annular metal plate 12 is attached to the lower end 8a of the peripheral edge of a turntable 8 on the inner surface of which magnets M1, M2, M3 and M4 are disposed in a manner alternately opposite in polarity, so that said metal plate 12 can be disposed at an interspace between said substrate and said insulation plate. Further, an annular thin synthetic resin molding 13 wherein four magnets N1, N2, N3 and N4 having substantially the same configuration are disposed printed at substantially equal distances from the rotation center of the turntable and in equidistantly spaced relation to one another, said four magnets being alternately opposite in polarity, is bonded to said annular metal plate 12 in a state wherein the disposition of said magnets N1, N2, N3 and N4 is in corresponding relation to the disposition of the coils S1, S2 and S3 arranged on said insulation plate 3. If construction is made as such, the driving torque of the turntable will be able to be increased since the magnets are disposed both above and below the coils S1, S2 and S3.

Figure 11:
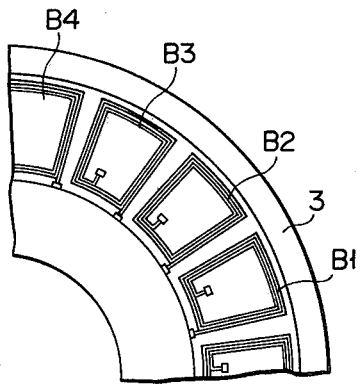
FIG. 11 is a fragmentary plan view illustrating a modified example of the upper surface construction of the insulation plate on the stationary substrate illustrated in FIG. 2.
Figure 12:
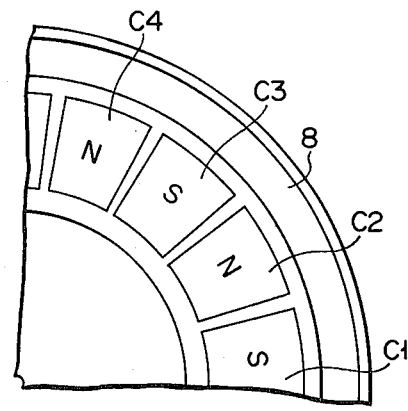
FIG. 12 is a fragmentary plan view illustrating a modified example of the inner surface construction of the turntable illustrated in FIG. 3.

In the embodiment illustrated in FIGS. 2 and 3, the three coils S1, S2 and S3 are disposed on the insulation plate 3 and the four magnets M1, M2, M3 and M4 are disposed on the inner surface of the turntable 8. But the coils and magnets are respectively generally provided in given numbers. For instance, as partially illustrated in FIG. 11, a plurality of coils B1, B2, B3, B4 . . . . can be disposed on the insulation plate 3 while, as partially illustrated in FIG. 12, a plurality of magnets C1, C2, C3, C4 . . . . can be dispoed on the inner surface of the turntable 8.

Figure 13:
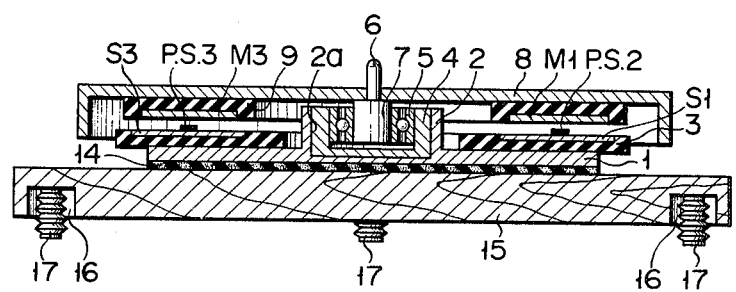
FIGS. 13 and 14 respectively are longitudinal sectional views illustrating partially improved examples of the apparatus according to the invention.
Figure 14:
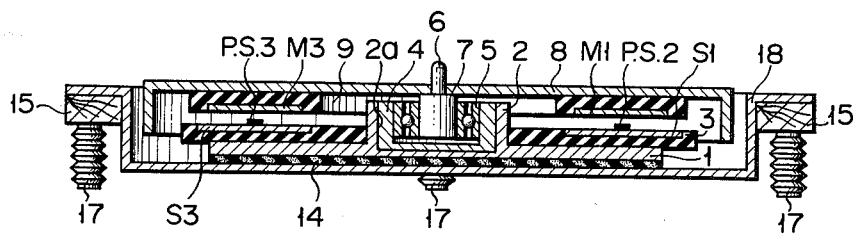

FIGS. 13 and 14 respectively illustrate examples partially improved in the turntable apparatus according to the invention. In the example of FIG. 13, a substrate 1 is fixedly mounted on a support plate 15 through a vibration absorbing member 14 such as a rubber plate. In the peripheral edge portions of the underside of the support plate 15 are formed concave sections 16, into which are inserted flexible members 17 such as air bellows. By said vibration absorbing member 14 there are absorbed, during the rotation of the turntable, the vibrations of the substrate 1 which result from the repulsive or attractive force between the magnets and the coils and from the vibration of the coils themselves. Further, by the support plate 15 formed thick and the flexible members 17 there can be suppressed the vibration of the apparatus itself due to the high frequency oscillation of the external environment. On the other hand, in the example of FIG. 14, a substrate 1 is incorporated within a dish-shaped member 18 through a vibration absorbing member 14, and is supported by the support plates 15 and flexible members 17 which are provided on the underside of the peripheral edge portion of said dish-shaped member 18. If construction is made as such, the turntable apparatus as a whole will be able to be formed into a flat configuration as compared with the apparatus illustrated in FIG. 13.

As above described, according to the invention, the turntable is directly driven by the electromagnetic force produced between a plurality of magnets having substantially the same configuratin disposed printed on the inner surface of the turntable of substantially equal distances from the rotation center of the turntable and in substantially equidistantly spaced relation to one another, said magnets being alternately opposite in polarity, and a plurality of coils disposed printed on the stationary substrate facing the turntable so that the disposition of the plurality of coils can be in corresponding relation to the disposition of said plurality of magnets. Therefore, the turntable can stably and smoothly be rotated at a desired speed. Further, by thinning the magnets and coils, the apparatus as a whole can be manufactured into a light one. Particularly where magnets prepared by printing magnetizable materials on a thin synthetic resin and magnetizing the magnetizable materials so as to render them alternately opposite in polarity, or thin synthetic resin molding magnets rendered alternately opposite in polarity are used as the foregoing magnets, and where printed coils are used as the foregoing coils, the turntable apparatus as a whole can be manufactured into a thin and light one.

On the other hand, as above described, where the above-mentioned turntable apparatus is used in a sounder device such as a record player, tape recorder, or the like, it often happens that the magnetic fluxes produced from the magnets arranged on the inner surface of the turntable are leaked over the turntable to produce sound noises. If, in such a case, a yoke plate is interposed between the turntable and the magnets so that the most part of said magnetic fluxes can be passed within the yoke plate, there will be able to be suppressed leakage of the magnetic fluxes over the turntable.

What we claim is:

1. A turntable apparatus comprising a stationary substantially planar substrate having a shaft; a turntable rotatably supported by said shaft on said stationary substrate and superposed over said stationary substrate, said turntable and said substrate lying in registry one with the other and in spaced parallel planes normal to the axis of rotation of the turntable, said turntable having an outer peripheral edge and an annular inner surface, an annular metal plate secured to and dependent from said turntable adjacent said outer peripheral edge; a doughnut-shaped insulation member fixedly supported on said stationary substrate to overlie said stationary substrate in spaced relation thereto in the direction of the axis of rotation of the turntable; a plurality of coreless coils disposed on said insulation member; a plurality of first magnets disposed on said inner surface of said turntable facing said insulation member; a plurality of second magnets disposed on said annular metal plate, said coils facing said first magnets and said second magnets in the direction of the axis of rotation of the turntable; position detecting means provided on said insulation member for detecting the position of each said magnet relative to each said coil; an electric power source supplying an electric power to said coils; means operable upon receipt of output signals from said position detecting means to control supply of a current to each of said plurality of coils thereby to cause a rotating magnetic field to be produced in the coils; and speed regulating means comprising means for detecting the rotational speed of said turntable and producing an electric output signal corresponding to the rotational speed of said turntable, means for producing an electric reference signal corresponding to a predetermined rotational speed of said turntable, and means operative in response to said electric input signal from the rotational speed detecting means and said electric reference signal from the electric reference signal producing means thereby to control the amount of a current supplied to each coil from said power source.

2. A turntable apparatus according to claim 1 wherein said plurality of coils have substantially the same configuration and are disposed on said insulation member at substantially equal distances from the axis of rotation of the turntable and at substantially equal distances from one another, said plurality of first magnets having substantially the same configuration and disposed on the inner surface of said turntable at substantially equal distances from the rotation axis of the turntable and at substantially equal distances from one another, any adjacent two of said first magnets being opposite in polarity to each other, said plurality of second magnets having substantially the same configuration and disposed on said annular metal plate at substantially equal distances from the rotation axis of the turntable and at substantially equal distances from one another, any adjacent two of said second magnets being opposite in polarity to each other.

3. A turntable apparatus according to claim 1 wherein each of said coils comprises a printed coil.

4. A turntable apparatus according to claim 1, further comprising a support member for said stationary substrate disposed on a side of said substrate remote from said turntable, a plurality of recesses formed about the peripheral edge portions of said support member on the side thereof remote from said substrate, elastic members for absorbing external vibrations from outside disposed within said recesses, a vibration absorbing member disposed between said stationary substrate and said support member and serving to absorb vibrations of said stationary substrate during rotation of said turntable.

5. A turntable apparatus according to claim 1 further comprising a dish-like member, support members and a vibration absorbing member, said dish-like member housing said stationary substrate and said turntable, said support members being disposed about the peripheral edge portion of the underside of said dish-like member, each said support member including a flexible member for absorbing external vibrations, and said vibration absorbing member being disposed between said stationary substrate and said dish-like member and serving to absorb vibrations of said stationary substrate during the rotations of said turntable.

6. A turntable apparatus according to claim 1 including a first synthetic resin body carried by said turntable along said inner surface, each of said first magnets being disposed on said first resin body.

7. A turntable apparatus according to claim 1 including a second synthetic resin body carried by said annular metal plate along a surface thereof facing said doughnut-shaped insulation member, each of said second magnets being disposed on said second resin body.

8. A turntable apparatus according to claim 1 wherein each of said first magnets comprises a magnet made of a thin molding of synthetic resin.

9. A turntable apparatus according to claim 1 wherein each of said second magnets comprises a magnet made of a thin molding of synthetic resin.

10. A turntable apparatus according to claim 1 wherein each of said first magnets comprises a first lump-like magnet.

11. A turntable apparatus according to claim 1 wherein each of said second magnets comprises a second lump-like magnet.

12. A turntable apparatus according to claim 1 including a yoke plate interposed between the inner surface of said turntable and said first magnets.

* * * * *